US012786065B2

(12) United States Patent
Singh

(10) Patent No.: US 12,786,065 B2
(45) Date of Patent: Nov. 3, 2026

(54) PARALLEL ON-DEMAND SLICE CONNECTIONS VIA CUSTOMER PREMISES EQUIPMENT

(71) Applicant: T-Mobile USA, Inc., Bellevue, WA (US)

(72) Inventor: Jasinder Pal Singh, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 20 days.

(21) Appl. No.: 19/090,798

(22) Filed: Mar. 26, 2025

(65) Prior Publication Data

US 2026/0303461 A1 Oct. 1, 2026

(51) Int. Cl.

*H04L 41/0895* (2022.01)
*H04L 12/14* (2024.01)
*H04L 41/0816* (2022.01)

(52) U.S. Cl.

CPC ...... *H04L 41/0895* (2022.05); *H04L 12/1453* (2013.01); *H04L 41/0816* (2013.01)

(58) Field of Classification Search

CPC ............. H04L 41/0816; H04L 41/0895; H04L 12/1453

See application file for complete search history.

(56) References Cited

U.S. PATENT DOCUMENTS 9,032,083 B2 5/2015 Scherer et al.
9,036,582 B2 5/2015 Scherer et al.
9,332,579 B2 5/2016 Scherer et al.
9,374,267 B2 6/2016 Poirier et al.
9,954,731 B2 4/2018 Siripunkaw et al.
10,158,532 B1 12/2018 Meredith et al.
11,296,952 B2 * 4/2022 Dhariwal .............. H04L 41/342
2006/0271666 A1 11/2006 Jones et al.
2015/0358399 A1 12/2015 Baugher et al.
2020/0059521 A1 * 2/2020 Sciancalepore ......... H04L 67/12
(Continued)

FOREIGN PATENT DOCUMENTS

DE 10229863 A1 2/2003
EP 1775898 B1 10/2013
EP 2672658 A1 12/2013
(Continued)

*Primary Examiner* — Kostas J Katsikis
(74) *Attorney, Agent, or Firm* — Ashurst Perkins Coie US LLP

(57) ABSTRACT

A slice orchestrator receives a request from a user device to establish an on-demand network slice connection. The slice orchestrator can determine whether the user device is in communication with the telecommunications network via a broadband wireless internet facilitated by CPE. The CPE can be in communication with a base station of the telecommunications network via a broadband network slice having a second set of properties for the broadband wireless internet. The slice orchestrator can transmit to the CPE a first parameter set for establishing the on-demand network slice with the first set of properties and a second parameter set for establishing the broadband wireless internet with the second set of properties. The CPE can be configured to set up a user plane function (UPF) for the user device to enable the user device to establish the on-demand slice network connection with the first set of properties with the CPE.

20 Claims, 8 Drawing Sheets

(56) References Cited

U.S. PATENT DOCUMENTS

| | | | | |
|---|---|---|---|---|
| 2023/0308855 | A1* | 9/2023 | Matolia | H04W 36/06 |

FOREIGN PATENT DOCUMENTS

| | | | |
|---|---|---|---|
| EP | 3163832 | A1 | 5/2017 |
| EP | 3188410 | A1 | 7/2017 |
| EP | 3300307 | A1 | 3/2018 |
| KR | 20020063883 | A | 8/2002 |
| KR | 101338035 | B1 | 12/2013 |
| WO | 2014116983 | A1 | 7/2014 |
| WO | 2017220112 | A1 | 12/2017 |
| WO | 2018038939 | A1 | 3/2018 |

* cited by examiner

PARALLEL ON-DEMAND SLICE CONNECTIONS VIA CUSTOMER PREMISES EQUIPMENT

BACKGROUND

A network slice service is a virtualized network architecture that allows multiple isolated and independent end-to-end networks to be created on a shared physical infrastructure. Each network slice can be tailored to meet specific requirements, such as latency, bandwidth, and security, to enable customized services for different applications and user devices. This technology is pivotal in 5G networks, providing the flexibility to support diverse use cases, from enhanced mobile broadband to ultra-reliable low-latency communications and massive machine-type communications. By leveraging network slicing, service providers can efficiently allocate resources and optimize network performance to meet varying demands.

BRIEF DESCRIPTION OF THE DRAWINGS

Detailed descriptions of implementations of the present invention will be described and explained through the use of the accompanying drawings.

Figure 1:
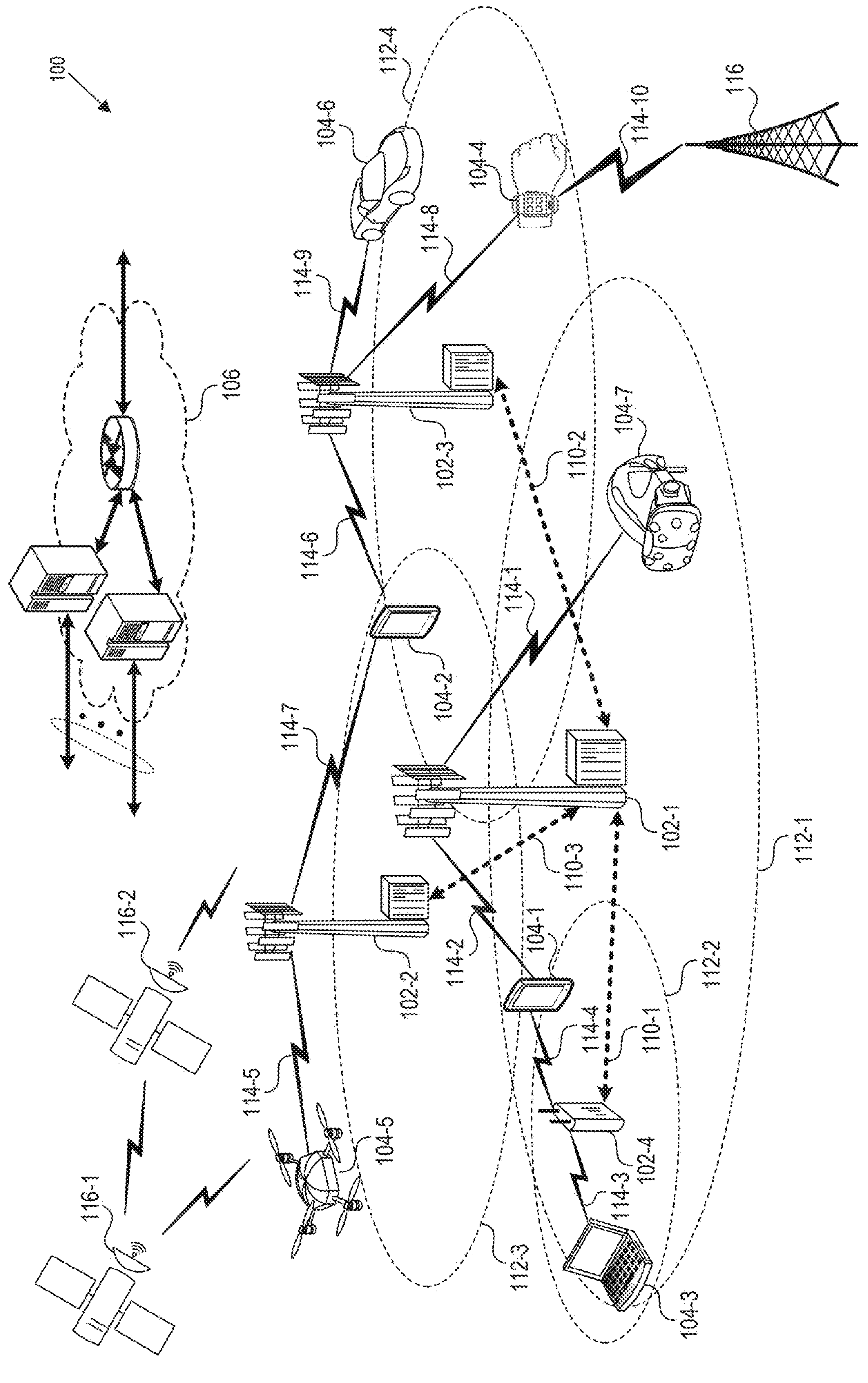
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology is related to providing on-demand network slice services for user devices that are connected to a telecommunications network via a home internet. A home internet (or a residential internet) is generally provided via customer premises equipment (CPE) located at a user's home. Home internet connections are typically broadband connections facilitating high-speed, always-on internet access that can support multiple devices and high-bandwidth activities. The home internet can be provided via a slice connection between the CPE and a base station. Conventionally, any user device in communication with the home internet cannot establish its own slice connection because the slice management systems (e.g., a slice orchestrator) are not configured to establish such connections via CPE while the CPE already has an established slice connection to the base station. For example, conventionally, the slice orchestrator cannot interrupt or interfere with the communication channels between the user device and the CPE. This prevents user devices connected to the internet via the CPE from establishing on-demand slice services. Users cannot thereby access on-demand slice services that could be desirable for using certain applications. For example, a user may wish to use an augmented reality/virtual reality (AR/VR) device or a gaming device. Operating such devices can require an internet connection having different properties (e.g., a lower latency internet connection) than the broadband internet connection provided via the CPE. Without the ability to access an on-demand network slice can reduce the users' enjoyment of the AR/VR or gaming devices.

The present technology provides for a method for providing either hybrid network slices or parallel network slices that can be established on-demand for devices in communication with a CPE. A user can request for the on-demand slice connection by sending a request to the slice orchestrator. The orchestrator can determine using the information on the request that the user device is in communication with the CPE. The orchestrator can then enable establishing the on-demand slice connection either as a hybrid slice connection or as a parallel slice connection with the broadband slice connection via the CPE. The present technology thereby enables devices to access on-demand network slices even when connected to the internet via the CPE. The ability to access the on-demand network slices can improve network services and provide a more enjoyable user experience, for example, for users of AR/VR or gaming devices connected to their home internet via a CPE.

In one example, a method for providing on-demand slice connections in a telecommunications network includes receiving, by a slice orchestrator of the telecommunications network, a request from a user device to establish an on-demand network slice connection. The request can include an indication of a geographic location of the user device and can identify a first set of properties requested for the on-demand network slice connection. Using the geographic location of the user device, the slice orchestrator can determine whether the user device is in communication with the telecommunications network via a broadband wireless internet facilitated by CPE. Determining that the user device is in communication with the telecommunications network via the broadband wireless internet can include determining that the geographic location of the user device is within a threshold distance of a location of the CPE. The CPE can be in communication with a base station of the telecommunications network via a broadband network slice having a second set of properties for the broadband wireless internet. Responsive to the determination that the user device is in communication with the telecommunications network via the broadband wireless internet, the slice orchestrator can establish a hybrid slice network connection between the base station and the CPE. The hybrid slice network connection can have a hybrid set of properties comprising a combination of at least one of the first set of properties and at least one of the second set of properties. The user device can connect to the hybrid slice network via the CPE.

In another example, a slice orchestrator for providing on-demand slice connections in a telecommunications network receives a request from a user device to establish an on-demand network slice connection. The request can include an indication of a geographic location of the user device and can identify a first set of properties requested for the on-demand network slice connection. Using the geographic location of the user device, the slice orchestrator can determine whether the user device is in communication with the telecommunications network via a first wireless internet facilitated by CPE, where the first wireless internet is associated with a second set of properties. Responsive to the determination that the user device is in communication with the telecommunications network via the first wireless internet, the slice orchestrator can establish a hybrid slice network connection between the base station and the CPE. The hybrid slice network connection can have a hybrid set of properties comprising a combination of at least one of the first set of properties and at least one of the second set of properties, and the user device can connect to the hybrid slice network via the CPE.

In yet another example, a slice orchestrator of a telecommunications system receives a request from a user device to establish an on-demand network slice connection. The request can include an indication of a geographic location of the user device and can identify a first set of properties requested for the on-demand network slice connection. Using the geographic location of the user device, the slice orchestrator can determine whether the user device is in communication with the telecommunications network via a first wireless internet facilitated by CPE, where the first wireless internet is associated with a second set of properties. Responsive to the determination that the user device is in communication with the telecommunications network via the first wireless internet, the slice orchestrator can establish a hybrid slice network connection between the base station and the CPE. The hybrid slice network connection can have a hybrid set of properties comprising a combination of at least one of the first set of properties and at least one of the second set of properties, and the user device can connect to the hybrid slice network via the CPE.

In yet another example, a slice orchestrator receives a request from a user device to establish an on-demand network slice connection. The request can include an indication of a geographic location of the user device and can identify a first set of properties requested for the on-demand network slice connection. Using the geographic location of the user device, the slice orchestrator can determine whether the user device is in communication with the telecommunications network via a broadband wireless internet facilitated by CPE. Determining that the user device is in communication with the telecommunications network via the broadband wireless internet can comprise determining that the geographic location of the user device is within a threshold distance of a location of the CPE. The CPE can be in communication with a base station of the telecommunications network via a broadband network slice having a second set of properties for the broadband wireless internet. Responsive to the determination that the user device is in communication with the telecommunications network via the broadband wireless internet, the slice orchestrator can transmit to the CPE a first parameter set for establishing the on-demand network slice with the first set of properties and a second parameter set for establishing the broadband wireless internet with the second set of properties. Upon receiving the first parameter set and the second parameter set, the CPE can be configured to set up a user plane function (UPF) for the user device to enable the user device to establish the on-demand slice network connection with the first set of properties with the CPE (e.g., in parallel with the slice associated with the broadband wireless internet).

In yet another example, the slice orchestrator can receive a request from a user device to establish an on-demand network slice connection. The request can include an indication of a geographic location of the user device and can identify a first set of properties requested for the on-demand network slice connection. Using the geographic location of the user device, the slice orchestrator can determine whether the user device is in communication with the telecommunications network via a broadband wireless internet facilitated by CPE. The CPE can be in communication with a base station of the telecommunications network via a broadband network slice having a second set of properties for the broadband wireless internet. Responsive to the determination that the user device is in communication with the telecommunications network via the broadband wireless internet, the slice orchestrator can transmit to the CPE a first parameter set for establishing the on-demand network slice with the first set of properties and a second parameter set for establishing the broadband wireless internet with the second set of properties. Upon receiving the first parameter set and the second parameter set, the CPE can be configured to establish the on-demand slice network connection with the first set of properties with the CPE.

In yet another example, an at least one non-transitory, computer-readable storage medium includes instructions, when executed by at least one data processor of a slice orchestrator of a telecommunications network, cause a slice orchestrator to receive a request from a user device to establish an on-demand network slice connection. The request can include an indication of a geographic location of the user device and can identify a first set of properties requested for the on-demand network slice connection. Using the geographic location of the user device, the slice orchestrator can determine whether the user device is in communication with the telecommunications network via a broadband wireless internet facilitated by CPE. The CPE can be in communication with a base station of the telecommunications network via a broadband network slice having a second set of properties for the broadband wireless internet. Responsive to the determination that the user device is in communication with the telecommunications network via the broadband wireless internet, the slice orchestrator can transmit to the CPE a first parameter set for establishing the on-demand network slice with the first set of properties and a second parameter set for establishing the broadband wireless internet with the second set of properties. Upon receiving the first parameter set and the second parameter set, the CPE can be configured to establish the on-demand slice network connection with the first set of properties with the CPE.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a CPE, a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
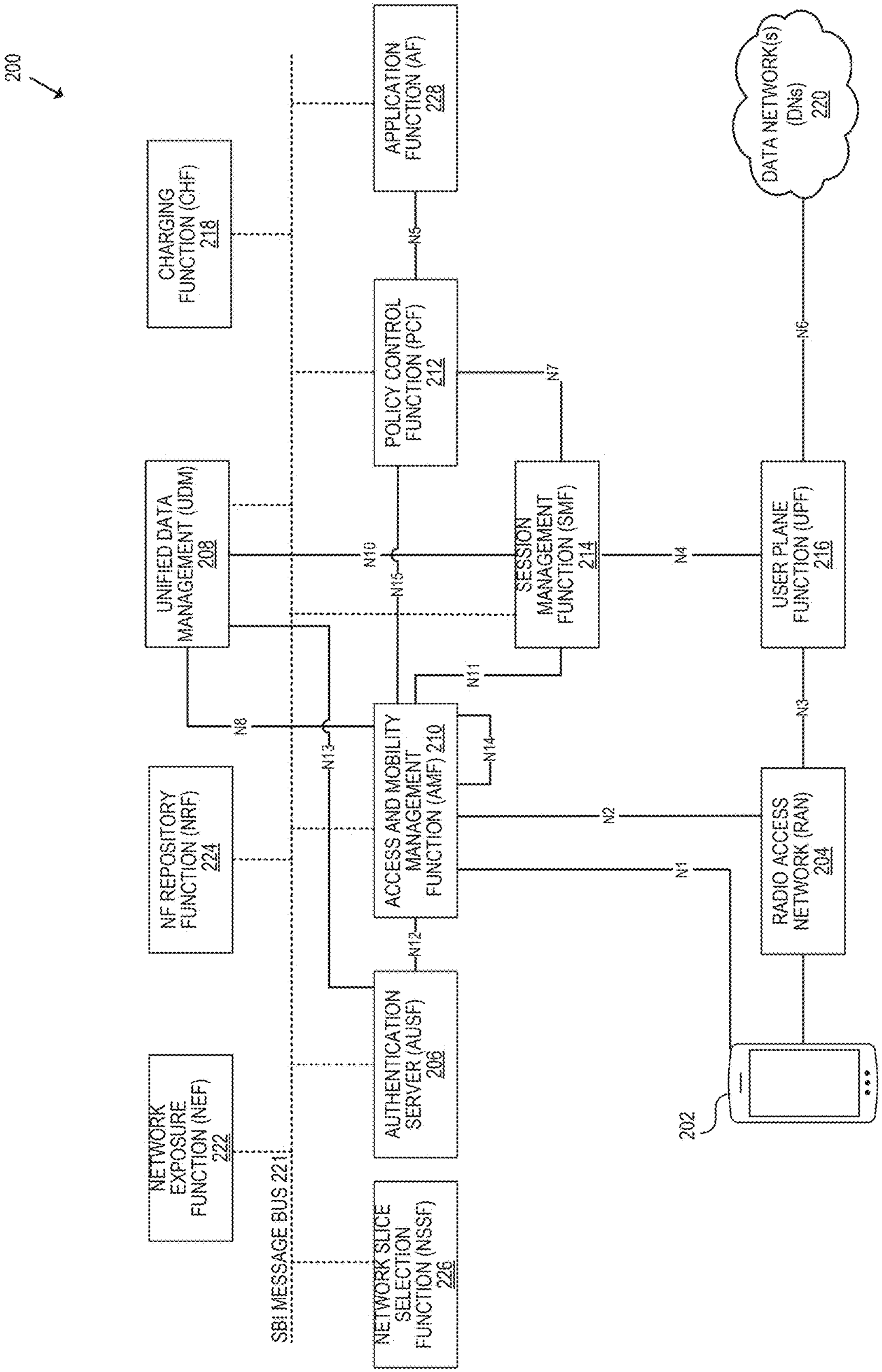
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Network Slice Connections Via CPEs

Figure 3:
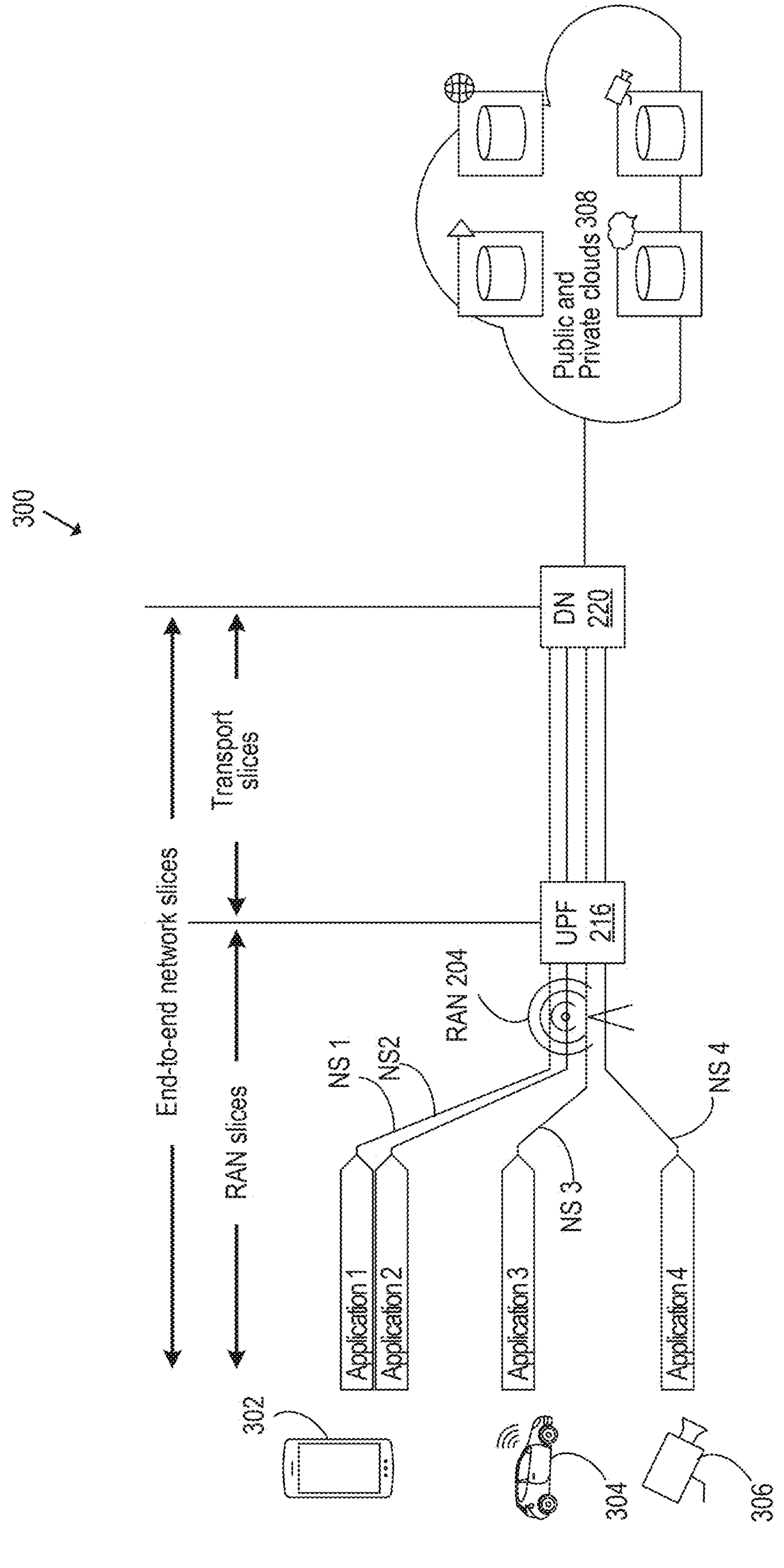
FIG. 3 is a block diagram that illustrates an example network slicing system in a 5G network.

FIG. 3 is a block diagram that illustrates an example network slicing environment 300 in a 5G network. The network slicing environment 300 enables multiplexing of virtualized and independent logical networks (i.e., network slices NS1 through NS4) on the same physical network infrastructure. In 5G wireless networks, network slicing assumes a central role designed to efficiently embrace multiple services with very different service-level requirements (e.g., data transfer speed, reliability, bandwidth). The end-to-end network slices can be defined between wireless devices (e.g., wireless devices 302, 304, and 306) and DN 220. For example, each network slice is an isolated end-to-end network tailored to fulfill diverse requirements requested by a particular application (e.g., wireless applications 1 through 4 associated with the wireless devices 302, 304, and 306). The network slicing environment 300 can be in communication with public and private clouds 308. For example, the clouds 308 can include cloud servers associated with the different wireless applications 1 through 4. While FIG. 3 demonstrates a network slicing environment in a 5G network, one of skill in the art would understand that the features disclosed here would apply to other network topologies as well (e.g., 3G, 4G, 6G, and LTE).

An infrastructure associated with the network slicing system includes hardware and software resources, such as user equipment and/or compute-, storage- and networking-hardware equipment, as well as the services and software programs stored therein. The infrastructure can be used to implement physical network nodes and/or to define a distributed cloud environment, such as Physical Network Functions (PNFs) and/or the Network Functions Virtualization Infrastructure (NFVI). The infrastructure provides the support and management functionality that allows for the deployment and operation of individual network slices. The infrastructure can include a collection of PNFs. For example, it provides the user control and application plane functionality across the different network segments, including the RAN slices between wireless devices (e.g., wireless devices 302, 304, and 306) and the UPF 216 and transport slices between the UPF 216 and DN 220.

Figure 4:
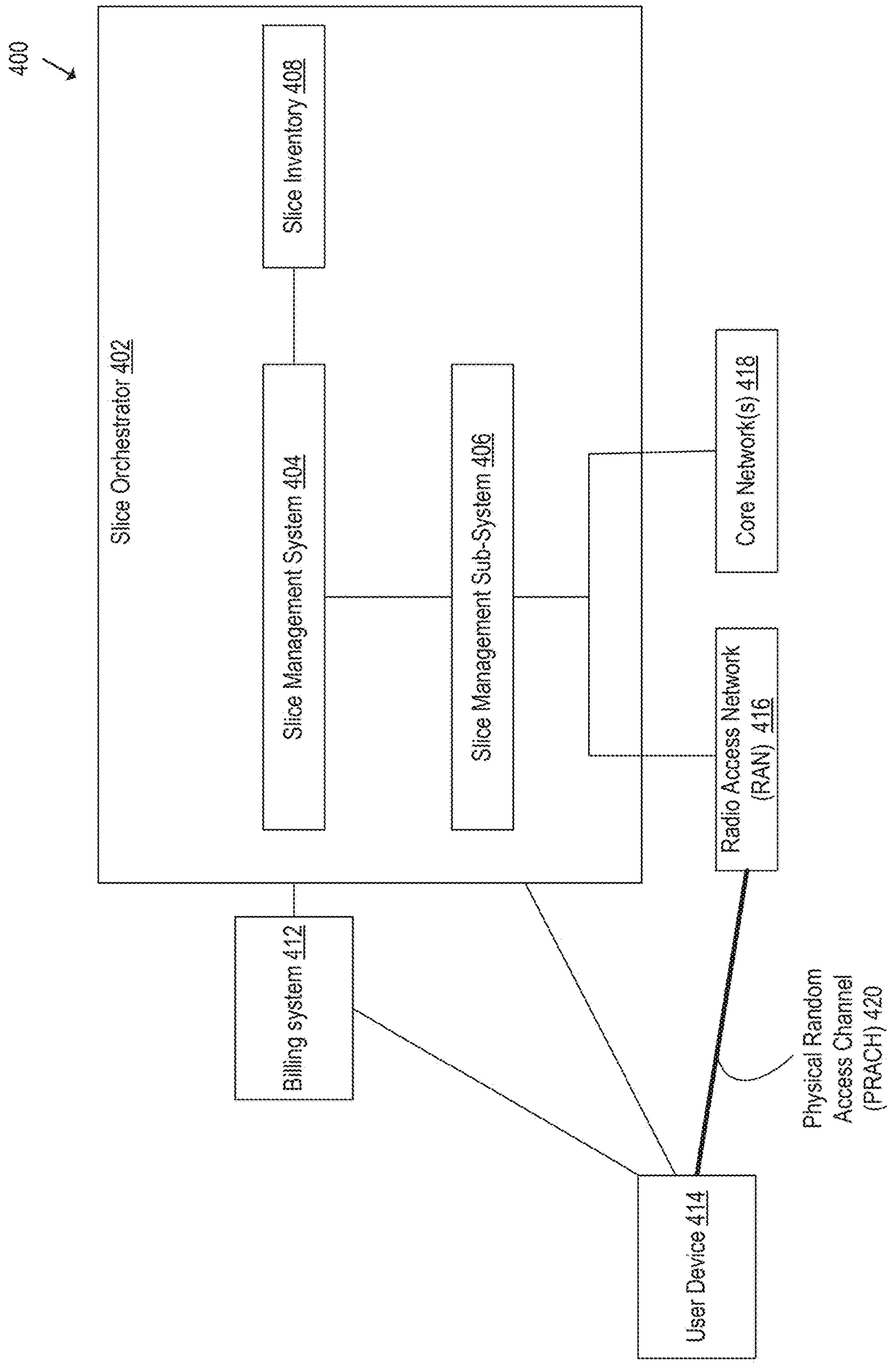
FIG. 4 is a block diagram that illustrates an environment for providing and managing network slice connections, in accordance with some embodiments.

FIG. 4 is a block diagram that illustrates an environment 400 for providing and managing network slice connections in accordance with some embodiments. The environment 400 can include a slice orchestrator 402, a billing system 412, one or more radio access networks (e.g., the RAN 416), and core network functions 418 (e.g., corresponding to the core network functions 106 described with respect to FIG. 2). The environment 400 can be associated with the network 100 described with respect to FIG. 1. The environment 400 is in communication with multiple user devices (e.g., a user device 414) associated with a wireless network (e.g., the network 100 in FIG. 1). The RAN 416 and the core network functions 418 are associated with base stations (e.g., the base stations 102 in FIG. 1). The environment 400 is configured to provide network slice connections (e.g., the network slices NS1 through NS4 in FIG. 3) to the user devices and manage the slice connection operations, including establishing network slice connections between the user devices and the RAN 416.

The slice orchestrator 402 is configured to manage and allocate slice network resources dynamically to create multiple virtual networks on a shared physical infrastructure. For example, the slice orchestrator 402 facilitates the establishment of network slices such that each slice meets performance and service requirements. The slice orchestrator 402 can include a slice management system 404, a slice inventory 408, and a slice management sub-system 406. The slice management system 404 can include a communication service management function (CSMF) and a network slice management function (NSMF). The CSMF can be configured to act as an intermediary between a customer-facing service layer (e.g., the user device 414 and/or the billing system 412) and a network-facing management layer (e.g., the slice management sub-system 406). The NSMF can be configured to establish, monitor, and/or terminate network slice connections. For example, the NSMF can facilitate proper configuration of network slices and meeting requirements and service level agreements (SLAs) defined by the CSMF. The slice management system 404 can be in communication with the slice inventory 408. The slice inventory 408 can include a repository that facilitates tracking of the network slices, including their configurations, resources, and status, within a network slicing environment.

The slice management system 404 communicates with the slice-management sub-system 406. The slice-management sub-system 406 can include one or more network slice subnet management functions (NSSMFs). Each NSSMF can be associated with a particular network slice subnet (e.g., an R-NSSMF for the RAN 416 and a C-NSSMF for the core network functions 418). An NSSMF can manage resource allocation, slice configuration, and monitoring within its particular network slice subnet to ensure the proper functioning and performance of a network slice within the subnet.

The billing system 412 is in communication with the user devices, such as the user device 414. The billing system 412 can be configured to process payments, manage the usage data, calculate charges, and generate invoices for customers based on their service plans (subscriptions) and/or consumption. In some implementations, the communication is through a software application associated with the network 100 and operating on the user devices. For example, the software application is provided by a service provider associated with the network 100. A user can manage their network connections, including slice network connections, through the software application. A user can, for example, request an on-demand slice connection through the software application on their user device 414. In some implementations, the request can be associated with a payment. In such implementations, a user can make a payment (e.g., an online payment with a credit card) on their user device 414 (or on a different device). The payment can be received by the billing system 412, which then transmits an indication to the slice orchestrator 402 (e.g., the slice management system 404) that indicates that the user device 414 is requesting the on-demand network connection.

To establish an on-demand slice connection, the user device 414 can send a request (e.g., using the software application associated with the network 100) to initiate slice connection establishment to the RAN 416 via a PRACH 420. The request can include a PRACH preamble, which is a short, unique signal transmitted by the user device 414 to the RAN 416 to initiate the random-access procedure and establish initial communication. The PRACH preamble can include a preamble sequence that operates as an identifier for the attempt to initiate a slice connection and timing information (e.g., a timestamp). A PRACH preamble can be selected from a set of predefined PRACH preambles. For example, the set of PRACH preambles for the LTE and 5G NR networks includes 64 PRACH preambles. In some implementations, the communication between the user device 414 and the billing system, the slice orchestrator 402 and/or the base station for establishing on-demand slice connection can be facilitated by the software application on the user device 414.

Figure 5:
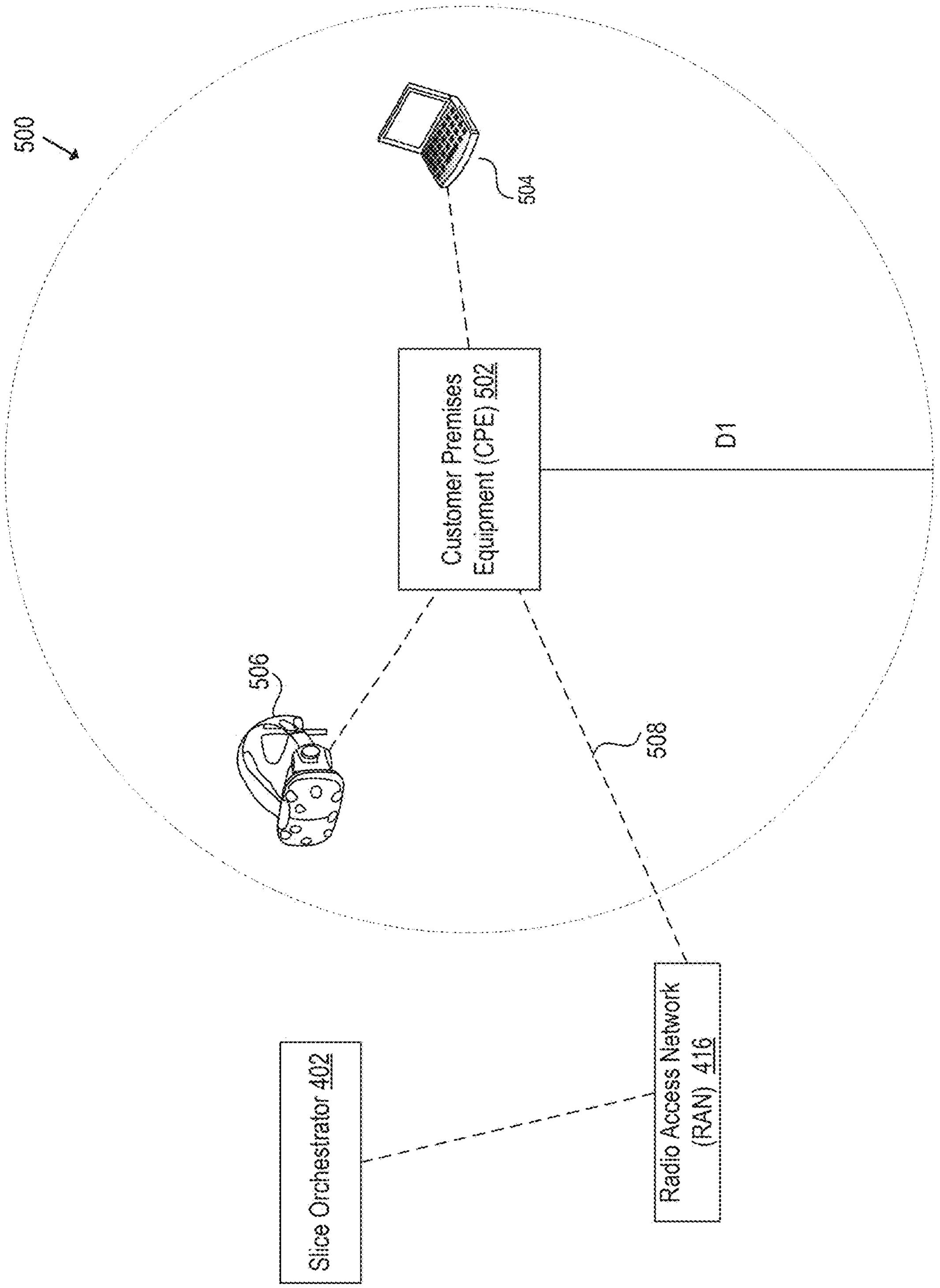
FIG. 5 is a block diagram illustrating a home internet environment for providing slice connections, in accordance with some embodiments.

FIG. 5 is a block diagram illustrating a home internet environment 500 for providing slice connections, in accordance with some embodiments. Generally, a home internet is a wireless internet service configured to offer, for example, high-speed internet access using 5G or 4G LTE networks. The home internet environment 500 can be associated with a residential location (e.g., a user's home). As shown, the home internet environment 500 is facilitated by a CPE device 502 that is configured to provide an internet connection (e.g., a broadband internet connection) to multiple user devices (e.g., devices 504 and 506) located within the coverage area of the CPE device 502. A CPE can include telecommunications hardware, such as a modem, a router, and a set-top box. In FIG. 5, the coverage area is illustrated with a broken circular region having a diameter D1. The coverage area can also be non-circular and/or asymmetric. The region has a radius (e.g., a threshold distance from the CPE to the edge of the coverage area) that can reach over at least the residential location for which the CPE is configured to provide an internet connection. Though the home internet environment 500 is here described as a home internet connection, similarly a CPE can provide localized internet coverage to any region (e.g., a commercial building or facility).

As explained, the CPE, being connected to the 5G or 4G LTE network, is configured to provide high-speed, reliable, always-on internet access supporting the multiple user devices. Such an internet connection can be provided by a slice connection 508 between the CPE and the RAN 416, as shown. The slice connection can be established, managed, and maintained by the slice orchestrator 402. Further, the slice orchestrator 402 can be configured to establish and manage on-demand slice connections to the user devices 504 and 506 that are provided either as hybrid slices between the CPE and the RAN 416 or as parallel network slices including the broadband slice connection for the home internet and the on-demand slice for the user device.

Figure 6:
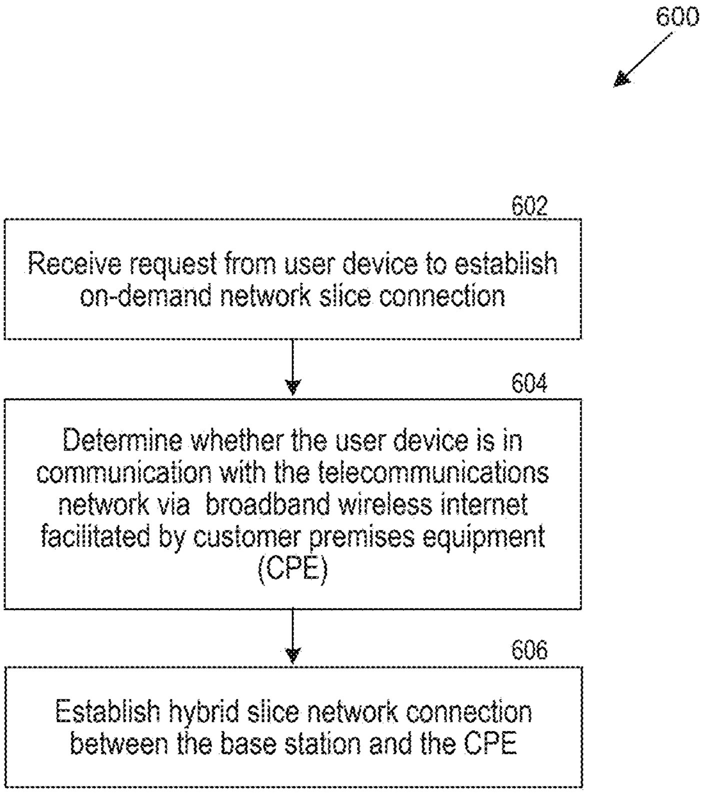
FIG. 6 is a flowchart that illustrates a process for providing hybrid slice connections for devices in home internet, in accordance with some embodiments.

FIG. 6 is a flowchart that illustrates a process for providing hybrid slice connections for devices in the home internet, in accordance with some embodiments. The process 600 can be performed by a slice orchestrator associated with a wireless network (e.g., the slice orchestrator 402 in FIG. 4 associated with the wireless network 100 in FIG. 1). The slice orchestrator can include at least one hardware processor and at least one non-transitory memory storing instructions (e.g., a computer system 800 described with respect to FIG. 8). When the instructions are executed by the at least one hardware processor, the device performs the process 600.

At 602, the slice orchestrator of the telecommunications network receives a request from a user device (e.g., the user device 504 or 506 in FIG. 5) to establish an on-demand network slice connection. The user device can be any type of wireless device such as the wireless device 104 described with respect to FIG. 1. The request can include an indication of a geographic location of the user device and can identify a first set of properties requested for the on-demand network slice connection.

The geographic location can be determine by the user device. In some implementations, the user device can determine its geographic location, for example, using Wi-Fi positioning system (WPS). The WPS can be used to determine a device's location based on the Wi-Fi signals transmitted from a Wi-Fi access point (e.g., a modem, or a router), such as a CPE (e.g., the CPE 502 in FIG. 5 or any other CPE). For example, an access point broadcasts signals detected by the user device. The user device can measure the signal strength (RSSI) and/or time of flight (ToF) of the signals to determine its distance from the access point. Further, the location of the CPE can be recorded in a database (e.g., by the service provider of the network 100) and the user device can query the database to identify the location of the CPE. If multiple Wi-Fi signals are detected, the user device can further apply triangulation to determine its position using WPS. In some implementations, the user device can determine its geographic location using Global Positioning System (GPS) (e.g., using the user device's GPS sensor). In some implementations, the user device can determine its location using signal strength and timing information from base stations.

At 604, using the geographic location of the user device, the slice orchestrator determines whether the user device is in communication with the telecommunications network via a broadband wireless internet facilitated by CPE. Determining that the user device is in communication with the telecommunications network via the broadband wireless internet can involve determining that the geographic location of the user device is within a threshold distance of a location of the CPE. The threshold distance can correspond to a diameter of a coverage area of the connection provided by the CPE (e.g., the diameter D1 in FIG. 5). In some implementations, the determination can be based on the signal strength that the user device can receive from the CPE.

The CPE can be in communication with a base station (e.g., a base station associated with the RAN 416 in FIG. 4) of the telecommunications network via a broadband network slice having a second set of properties for the broadband wireless internet. In some implementations, the broadband wireless internet facilitated by the CPE is configured to provide a 5G network connection for a residential location (e.g., the user's home). The threshold distance can define a geographic area covering at least the residential location.

The first and second set of properties can define and manage the specific characteristics and requirements of a particular network slice. This allows different slices to be tailored to the needs of different applications or user devices within a shared physical network infrastructure. Exemplary slice properties can include bandwidth, which determines the data transfer rate; latency, which measures the delay in data transmission; reliability, ensuring consistent and dependable connectivity; isolation, which separates different slices to prevent interference and ensure security; scalability, allowing the network slice to adjust resources based on demand; quality of service (QoS), which prioritizes traffic to meet specific performance criteria; mobility support, ensuring seamless connectivity for mobile users; and resource allocation, which dynamically assigns network resources to optimize performance and efficiency. For example, each of the first set of properties for the on-demand slice network and the second set of properties of the broadband network slice define a latency range, a jitter range, and/or a bandwidth range.

At 606, responsive to the determination that the user device is in communication with the telecommunications network via the broadband wireless internet, the slice orchestrator establishes a hybrid slice network connection between the base station and the CPE. In some implementations, the slice orchestrator is configured to establish the hybrid slice network instantaneously. The user device can connect to the hybrid slice network via the CPE.

Generally, a hybrid slice network connection can be a combination of multiple network slices, each slice tailored to different service requirements. The combination forms a single, cohesive connection that includes the properties of the combined network slices. The hybrid slice network connection can have a hybrid set of properties comprising a combination of at least one property of the first set of properties and at least one property of the second set of properties. For example, the first set of properties includes a first latency range and the second set of properties includes a second latency range that is different from the first latency. The hybrid properties can include the first latency range and the second latency range. Latency is important, for example, for AR/VR and gaming applications because it directly impacts the responsiveness and real-time interaction, ensuring a smooth, immersive, and lag-free user experience. Therefore, a user wishing to start an AR/VR or gaming session can request for the on-demand network slice having a lower latency than the latency provided by the broadband wireless internet in order to have a better user experience.

In some implementations, the user device is configured to receive a payment for the requested on-demand network slice. The user device can be configured to generate the request to establish the on-demand network slice connection in response to receiving the payment. The payment can be received via a software application on the user device. The payment can require an authorization from the user to, e.g., charge the user's account or a credit card. An indication that the payment has been made can be transmitted by the user device to a billing system (e.g., the billing system 412). In some embodiments, no payment is required to generate the request. Instead, the user can provide an input via the software application on the user device to request for the on-demand network slice. The request is then transmitted to the slice orchestrator.

In some implementations, the slice orchestrator receives an indication that a payment for the on-demand slice has been received via the user device from the billing system associated with the telecommunications network. The slice orchestrator can determine whether the user device is in communication with the telecommunications network via the broadband wireless internet in response to receiving the indication that the payment has been received, in addition to receiving the request.

In some implementations, responsive to a determination that the geographic location of the user device is not within a threshold distance of a location of the CPE, the slice orchestrator can establish the on-demand network slice connection between the user device and the base station without the establishment of the hybrid slice connection. For example, the geographic information can indicate that the user device is not located within any home internet connections associated with the network 100 and therefore the orchestrator can establish a slice network between the base station and the user device as a regular slice network connection.

In some implementations, an additional user device is in communication with the telecommunications network via the broadband wireless internet facilitated by the CPE. Responsive to the establishment of the hybrid slice network connection between the base station and the CPE, the additional user device can connect to the hybrid slice network via the CPE. For example, in an instance that the user device 506 in FIG. 5 requests for the on-demand slice network while the user device 504 is also in communication with the broadband wireless internet provided by the CPE 502. Once the hybrid network slice is established, the user device 504 can be connected to the hybrid network slice via the CPE.

In some instances, instead of establishing a hybrid network, the slice orchestrator is configured to establish a separate on-demand network slice for the user device that operates in parallel with the broadband network. A process for providing such parallel slice connections for devices in home internet are described with respect to FIG. 7. Such an approach can be useful, for example, in instances where the hybrid slice connection cannot be configured for the user device due to, for example, user plane function (UPF) requirements and service level agreements (SLAs). Different applications (e.g., videogaming, AR/R, teleconferencing, security) using network slices can have different UPF requirements and SLAs. For example, the UPF for a user device in a 5G network can be configured to manage data traffic by routing and forwarding user data packets, manage Quality of Service (QoS) enforcement, and perform traffic inspection and filtering to ensure efficient and secure data transmission between the user device and networks. In some instances, the hybrid network slice cannot be applied to some of the UPF requirements of a user device or an application operating on a user device. In some implementations, the slice orchestrator determines, using the UPF requirements and/or SLAs, that the hybrid network slice of process 600 cannot be configured for the requested on-demand network slice. Responsive to this determination, the slice orchestrator instead provides a parallel slice connection, as will be described with respect to FIG. 7.

Figure 7:
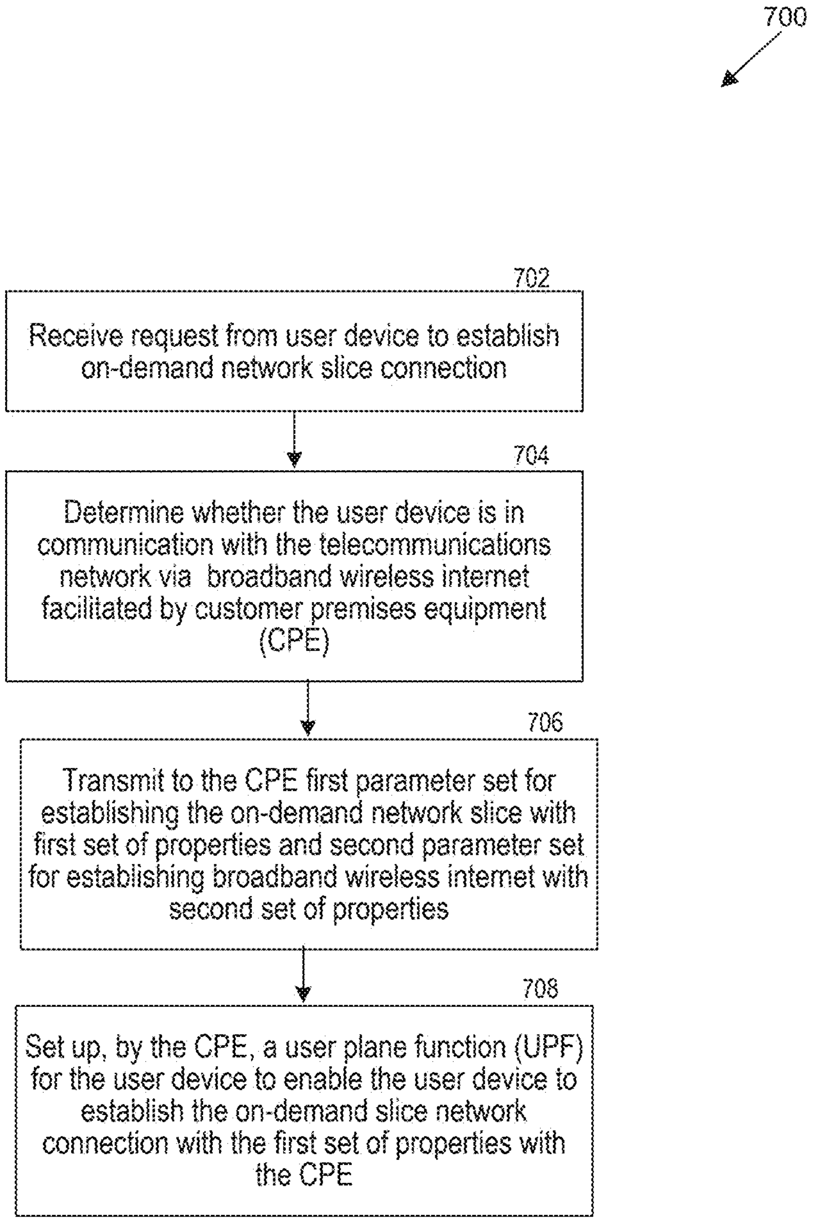
FIG. 7 is a flowchart that illustrates a process for providing parallel slice connections for devices in home internet, in accordance with some embodiments.

FIG. 7 is a flowchart that illustrates a process for providing parallel slice connections for devices in the home internet, in accordance with some embodiments. The process 700 can be performed by a slice orchestrator associated with a wireless network (e.g., the slice orchestrator 402 in FIG. 4, the wireless network 100 in FIG. 1). The slice orchestrator can include at least one hardware processor and at least one non-transitory memory storing instructions (e.g., a computer system 800 described with respect to FIG. 8).

When the instructions are executed by the at least one hardware processor, the device performs the process 700.

At 702, the slice orchestrator (e.g., the slice orchestrator 402 in FIG. 4) receives a request from a user device (e.g., the user device 504 or 506 in FIG. 5) to establish an on-demand network slice connection. The request can include an indication of a geographic location (as described with respect to FIG. 6) of the user device and can identify a first set of properties requested for the on-demand network slice connection.

At 704, using the geographic location of the user device, the slice orchestrator can determine whether the user device is in communication with the telecommunications network via a broadband wireless internet facilitated by CPE. Determining that the user device is in communication with the telecommunications network via the broadband wireless internet can include determining that the geographic location of the user device is within a threshold distance of a location of the CPE. The CPE can be in communication with a base station of the telecommunications network via a broadband network slice having a second set of properties for the broadband wireless internet.

At 706, responsive to the determination that the user device is in communication with the telecommunications network via the broadband wireless internet, the slice orchestrator can transmit to the CPE a first parameter set for establishing the on-demand network slice with the first set of properties and a second parameter set for establishing the broadband wireless internet with the second set of properties. The first and second sets of properties are described with respect to FIG. 6.

At 708, upon receiving the first parameter set and the second parameter set, the CPE can be configured to set up a UPF for the user device to enable the user device to establish the on-demand slice network connection with the first set of properties with the CPE. Setting up the UPF for the user device can include configuring a network interface to facilitate the on-demand slice connection between the CPE and the user device and/or configuring the network slices with specific parameters such as jitter, bandwidth, and latency. Setting up the UPF for a user device can also include configuring of network slices (e.g., defining and configuring the network slices with specific parameters such as bandwidth, latency, and QoS requirements tailored to the service needs); UPF Deployment (e.g., deploying the UPF instances in the network); session Management (e.g., establishing and managing user sessions by coordinating with the Session Management Function (SMF) to allocate resources and maintain session continuity); QoS Enforcement (e.g., implementing QoS policies); traffic routing and forwarding (e.g., configuring the UPF to route and forward user data packets); security and traffic inspection (e.g., setting up security measures and traffic inspection rules to protect data integrity and prevent unauthorized access or malicious activities); resource allocation (e.g., dynamically allocating network resources to the UPF based on real-time demand and usage patterns; monitoring and management (e.g., continuously monitoring the UPF performance and manage any issues or adjustments needed to maintain the service quality and reliability).

In some implementations, the CPE continues to communicate with a base station via the broadband network slice having the second set of properties. The broadband network slice connection and the on-demand slice connection can therefore be established in parallel. In some implementations, establishing the on-demand slice network connection between the user device and the CPE can include performing, by the CPE, on-the-air resource sharing. The on-the-air resource sharing can include dynamically changing allocation of slice resources between the on-demand network slice and the broadband wireless internet. For example, the on-the-air slice network resource sharing by CPE can include dynamically allocating and managing network resources such as bandwidth and spectrum among multiple network slices to enable flexible and adaptive resource distribution based on real-time demand and service requirements.

In some implementations, transmitting, by the slice orchestrator to the CPE, the first parameter set and the second parameter set can include transmitting the first parameter set and the second parameter set through the base station in communication with the CPE via the broadband network slice.

In some implementations, the first set of properties includes a first latency range, and the second set of properties includes a second latency range that is different from the first latency. The first parameter set can define the first latency range and the second parameter set can define the second latency range. In some implementations, each of the first set of properties and the second set of properties can define a latency range, a jitter range, and/or a bandwidth range.

In some implementations, an additional user device is in communication with the telecommunications network via the broadband wireless internet facilitated by the CPE. Responsive to the establishment of the on-demand slice network connection between the user device and the CPE, the additional user device can continue to communicate with the CPE via the broadband wireless internet. For example, the request for the on-demand network slice can be done by the user device 504 in FIG. 5 while the user device 506 is also in communication with the CPE.

As described with respect to FIG. 6, in some implementations, the user device is configured to receive a payment for the requested on-demand network slice (e.g., a user provides an authorization for a payment through a software application on the user device). The user device can be configured to generate the request to establish the on-demand network slice connection in response to receiving the payment. The slice orchestrator can receive from a billing system (e.g., the billing system 412 in FIG. 4) associated with the telecommunications network an indication that a payment for the on-demand slice has been received via the user device. The slice orchestrator can determine whether the user device is in communication with the telecommunications network via the broadband wireless internet in response to receiving the indication that the payment has been received.

In some implementations, responsive to a determination that the geographic location of the user device is not within a threshold distance of a location of the CPE, the slice orchestrator can establish the on-demand network slice connection between the user device and the base station without the establishment of the parallel slice networks. Further in some instances, more than one user device can request for the on-demand slice network connection (e.g., both of the user devices 504 and 506). In such instances, the orchestrator can establish multiple parallel network slice connections that satisfy the first set of properties, the second set of properties, as well as any other sets of properties requested by the user devices, in accordance with the process 700.

In some implementations, the request for the on-demand network slice connection defines a duration for establishing the on-demand network slice connection. The parallel slice networks described with respect to FIG. 7 can be automatically disconnected after the duration has been reached and the user device can automatically continue to connect to the broadband internet broadband wireless internet facilitated by the CPE.

Computer System

Figure 8:
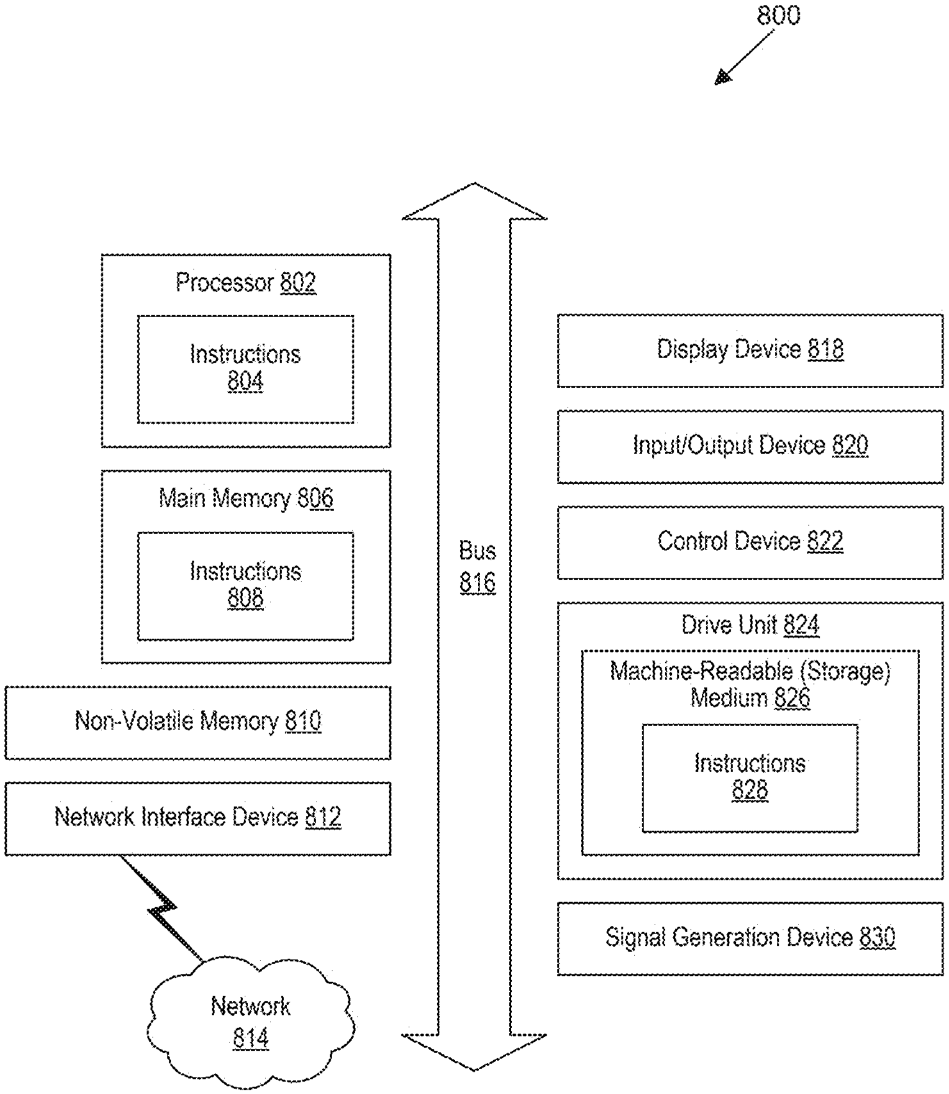
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or include a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically include one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method for providing on-demand slice connections in a telecommunications network, the method comprising:

receiving, by a slice orchestrator of the telecommunications network, a request from a user device to establish an on-demand network slice connection, wherein the request includes an indication of a geographic location of the user device, and wherein the request identifies a first set of properties requested for the on-demand network slice connection;

using the geographic location of the user device, determining, by the slice orchestrator, whether the user device is in communication with the telecommunications network via a broadband wireless internet facilitated by a customer premises equipment (CPE), wherein determining that the user device is in communication with the telecommunications network via the broadband wireless internet comprises determining that the geographic location of the user device is within a threshold distance of a location of the CPE, and wherein the CPE is in communication with a base station of the telecommunications network via a broadband network slice having a second set of properties for the broadband wireless internet; and responsive to the determination that the user device is in communication with the telecommunications network via the broadband wireless internet, transmitting, by the slice orchestrator to the CPE, a first parameter set for establishing the on-demand network slice with the first set of properties and a second parameter set for establishing the broadband wireless internet with the second set of properties, wherein, upon receiving the first parameter set and the second parameter set, the CPE is configured to set up a user plane function (UPF) for the user device to enable the user device to establish the on-demand slice network connection with the first set of properties with the CPE.

2. The method of claim 1, wherein the CPE continues to communicate with a base station via the broadband network slice having the second set of properties.

3. The method of claim 1, wherein establishing the on-demand slice network connection between the user device and the CPE comprises performing, by the CPE, on-the-air resource sharing, and wherein the on-the-air resource sharing comprises dynamically changing allocation of slice resources between the on-demand network slice and the broadband wireless internet.

4. The method of claim 1, wherein transmitting, by the slice orchestrator to the CPE, the first parameter set and the second parameter set comprises transmitting through the base station in communication with the CPE via the broadband network slice.

5. The method of claim 1, wherein the first set of properties includes a first latency range, and the second set of properties includes a second latency range that is different from the first latency, and wherein the first parameter set defines the first latency range and the second parameter set defines the second latency range.

6. The method of claim 1, wherein an additional user device is in communication with the telecommunications network via the broadband wireless internet facilitated by the CPE, and wherein, responsive to establishment of the on-demand slice network connection between the user device and the CPE, the additional user device continues to communicate with the CPE via the broadband wireless internet.

7. The method of claim 1, wherein each of the first set of properties and the second set of properties define a latency range, a jitter range, and/or a bandwidth range.

8. The method of claim 1, wherein the user device is configured to receive a payment for the requested on-demand network slice, and wherein the user device is configured to generate the request to establish the on-demand network slice connection in response to receiving the payment.

9. The method of claim 1, further comprising:

receiving, by the slice orchestrator from a billing system associated with the telecommunications network, an indication that a payment for the on-demand slice has been received via the user device, wherein the slice orchestrator determines whether the user device is in communication with the telecommunications network via the broadband wireless internet in response to receiving the indication that the payment has been received.

10. The method of claim 1, wherein setting up the UPF for the user device comprises configuring a network interface to facilitate the on-demand slice connection between the CPE and the user device.

11. A slice orchestrator for providing on-demand slice connections in a telecommunications network, the slice orchestrator comprising:

at least one hardware processor; and at least one non-transitory memory storing instructions, which, when executed by the at least one hardware processor, cause the slice orchestrator to:

receive a request from a user device to establish an on-demand network slice connection, wherein the request includes an indication of a geographic location of the user device, and wherein the request identifies a first set of properties requested for the on-demand network slice connection;

using the geographic location of the user device, determine whether the user device is in communication with the telecommunications network via a broadband wireless internet facilitated by a customer premises equipment (CPE), wherein the CPE is in communication with a base station of the telecommunications network via a broadband network slice having a second set of properties for the broadband wireless internet; and responsive to the determination that the user device is in communication with the telecommunications network via the broadband wireless internet, transmit, by the slice orchestrator to the CPE, a first parameter set for establishing the on-demand network slice with the first set of properties and a second parameter set for establishing the broadband wireless internet with the second set of properties, wherein, upon receiving the first parameter set and the second parameter set, the CPE is configured to establish the on-demand slice network connection with the first set of properties with the CPE.

12. The slice orchestrator of claim 11, wherein the CPE continues to communicate with a base station via the broadband network slice having the second set of properties.

13. The slice orchestrator of claim 11, wherein establishing the on-demand slice network connection between the user device and the CPE comprises performing, by the CPE, on-the-air resource sharing, and wherein the on-the-air resource sharing comprises dynamically changing allocation of slice resources between the on-demand network slice and the broadband wireless internet.

14. The slice orchestrator of claim 11, wherein transmitting, by the slice orchestrator to the CPE, the first parameter set and the second parameter set comprises transmitting through the base station in communication with the CPE via the broadband network slice.

15. The slice orchestrator of claim 11, wherein the first set of properties includes a first latency range, and the second set of properties includes a second latency range that is different from the first latency, and wherein the first parameter set defines the first latency range and the second parameter set defines the second latency range.

16. At least one non-transitory, computer-readable storage medium comprising instructions recorded thereon, wherein the instructions, when executed by at least one data processor of a slice orchestrator of a telecommunications network, cause the slice orchestrator to:

receive a request from a user device to establish an on-demand network slice connection, wherein the request includes an indication of a geographic location of the user device, and wherein the request identifies a first set of properties requested for the on-demand network slice connection;

using the geographic location of the user device, determine whether the user device is in communication with the telecommunications network via a broadband wireless internet facilitated by a customer premises equipment (CPE), wherein the CPE is in communication with a base station of the telecommunications network via a broadband network slice having a second set of properties for the broadband wireless internet; and responsive to the determination that the user device is in communication with the telecommunications network via the broadband wireless internet, transmit, by the slice orchestrator to the CPE, a first parameter set for establishing the on-demand network slice with the first set of properties and a second parameter set for establishing the broadband wireless internet with the second set of properties, wherein, upon receiving the first parameter set and the second parameter set, the CPE is configured to establish the on-demand slice network connection with the first set of properties with the CPE.

17. The at least one non-transitory, computer-readable storage medium of claim 16, wherein the CPE continues to communicate with a base station via the broadband network slice having the second set of properties.

18. The at least one non-transitory, computer-readable storage medium of claim 16, wherein establishing the on-demand slice network connection between the user device and the CPE comprises performing, by the CPE, on-the-air resource sharing, and wherein the on-the-air resource sharing comprises dynamically changing allocation of slice resources between the on-demand network slice and the broadband wireless internet.

19. The at least one non-transitory, computer-readable storage medium of claim 16, wherein transmitting, by the slice orchestrator to the CPE, the first parameter set and the second parameter set comprises transmitting through the base station in communication with the CPE via the broadband network slice.

20. The at least one non-transitory, computer-readable storage medium of claim 16, wherein the first set of properties includes a first latency range, and the second set of properties includes a second latency range that is different from the first latency, and wherein the first parameter set defines the first latency range and the second parameter set defines the second latency range.

* * * * *